United States Patent [19]

Zack

[11] 4,139,026

[45] Feb. 13, 1979

[54] PIPE ELBOW FITTING COVER

[75] Inventor: Arthur E. Zack, Woodbridge, N.J.

[73] Assignee: Johns-Manville Corporation, Denver, Colo.

[21] Appl. No.: 837,676

[22] Filed: Sep. 29, 1977

[51] Int. Cl.² ............................................. F16L 57/00
[52] U.S. Cl. .................................... 138/178; 138/99; 138/110; 285/45
[58] Field of Search ......................... 138/178, 99, 110; 285/45; 156/212, 218

[56] References Cited

U.S. PATENT DOCUMENTS 3,960,181  6/1976  Baur et al. ............................ 138/178

*Primary Examiner*—Richard E. Aegerter
*Attorney, Agent, or Firm*—Robert M. Krone; Joseph J. Kelly; James W. McClain

[57] ABSTRACT

A pipe elbow fitting cover is described which can be manually folded from a first open trough-like shape to a second shape generally corresponding to the shape of the elbow to be covered and which incorporates means to maintain that second shape without the application of any external force. The means to maintain the second position comprises the creation of depressions on the inner side of the elbow curve and centered on the center diagonal, tapering toward the ends of the elbow curve.

2 Claims, 6 Drawing Figures

PIPE ELBOW FITTING COVER

BACKGROUND OF THE INVENTION

The invention herein relates to jacketing for insulated pipe fittings, particularly elbows. In the past it has been common to insulate straight runs of pipe and to cover the insulation with protective jacketing, either of plastic or metal. Where straight runs of pipe have been involved, fabrication and installation of the insulation and jacketing has been easy, since the insulating can be fabricated in semi-cylindrical segments and the jacketing applied in sheet form either before or after installation of the insulation.

The numerous fittings in a pipe line have, however, created considerable difficulty in fabrication and installation of equivalent insulated coverings. Resort has generally been had to custom fabricated insulated coverings (such as those shown in U.S. Pat. Nos. 3,153,546, and 3,631,898) or mitered sectional fittings (such as those shown in U.S. Pat. No. 3,222,777) or to the use of troweled and molded cements covered with fabric strips such as burlap.

The insulation and jacketing of the most common type of pipe fittings, 90° elbows, was vastly simplified by the introduction several years ago of a one piece foldable elbow cover of the type shown in U.S. Pat. No. 3,495,629, issued to Botsolas et al. Because of its significant superiority and ease of use, the Botsolas et al elbow cover rapidly gained wide acceptance in the market place, a distinction it enjoys to this day.

Recently there has been a recognition that, despite the Botsolas et al fitting cover's superiority over other types of elbow jacketing, it has one disadvantage. This disadvantage lies in the Botsolas et al fitting cover's inability to maintain itself in a position intermediate its initial open shape and the final elbow shape. It therefore cannot be self-retained in a preliminary position covering the insulated elbow, but rather must be mechanically held in its final shape by the installer prior to final securing (with tape, pins, or the like), since its resilience otherwise causes it to open up and resume its original trough-like shape. In some circumstances such as where the installation is being made in a cramped location the installer may therefore have difficulty retaining the cover in its closed elbow position while he applies the tape or other securing means.

One approach to overcoming the tendency of the Botsolas et al cover to spring open has been to fold the cover into a semi-closed position immediately following fabrication and then to heat treat the folded cover in an oven for a few minutes which causes the cover to lose the tendency to reopen spontaneously. This approach, however, has been unsatisfactory for two reasons: it requires an extra manufacturing step with the attendant time and expense and also it has been found that if the heat treated cover is reheated later (as by being stored in a hot warehouse for a prolonged period) the effect of the heat treating is destroyed and the cover once again regains its tendency to reopen.

Consequently it would be of major significance to have a fitting cover which would incorporate all of the advantages of the Botsolas et al cover but which would have incorporated into its structure and geometry means which would allow it to be retained in a convenient intermediate partially folded position for installation without the need of mechanical restraints.

BRIEF SUMMARY OF THE INVENTION

The invention herein is an improvement in a cover for jacketing an insulated pipe elbow joint wherein a single integral structure formed from a flexible, resilient, nonmetallic material is formed in a first elongated open-ended trough-like shape and is then manually folded into a second shape which generally corresponds to that of the insulated pipe elbow joint, but which requires application of an external force to return said second shape.

The improvement of this invention comprises means incorporated into said single integral structure which permits said cover to be manually folded into and retained in said second shape without the application of any external force.

In a preferred embodiment, said means comprises the creation of depressions in the lower part of each side of the middle of the curve of said second shape.

DETAILED DESCRIPTION AND PREFERRED EMBODIMENTS

Figure 1:
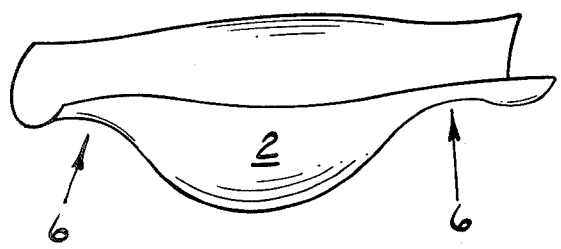
FIGS. 1-4 illustrate sequentially the first or open shape of the cover of this invention, two self-retained intermediate or second shapes, and the final closed shape of the cover of this invention.

The improved fitting cover of this invention may be best understood by reference to the drawings. FIG. 1 illustrates the fitting cover 2 in its "open" or trough-like shape following fabrication. This shape has distinct advantages in that a plurality of covers of this shape may be readily stacked, packaged and shipped. It therefore retains these advantageous features of the Botsolas et al fitting cover.

Figure 2:
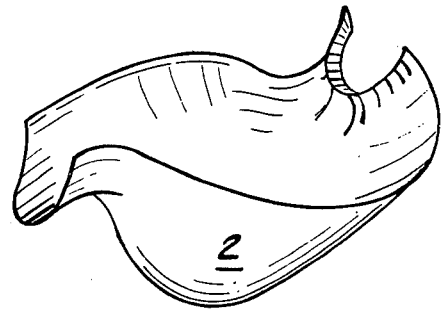
Figure 3:
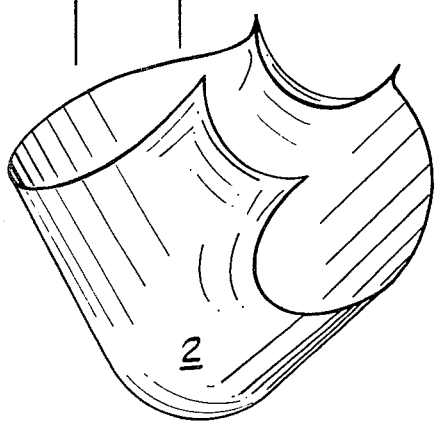
Figure 4:
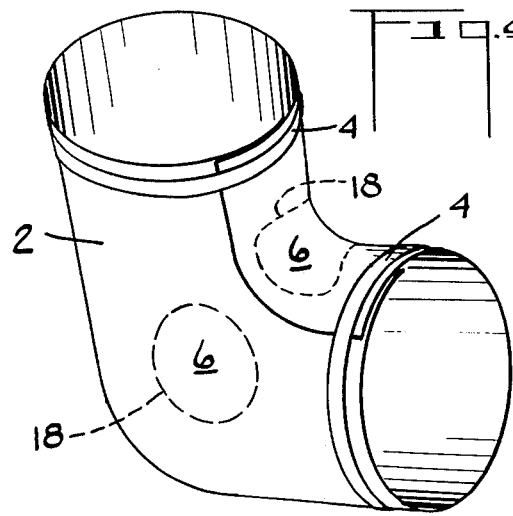

In use, however, the fitting cover must ultimately be folded into the shape in FIG. 4. During such folding the cover will pass through the shapes illustrated in FIGS. 2 and 3. Each of these last two shapes has advantageous characteristics, in that either shape (and particularly that of FIG. 3) can be used to retain the fitting cover in preliminary position on a pipe elbow while the installer obtains and prepares to affix the tape or other restraining means 4 used to permanently install the fitting cover in its final elbow shape shown in FIG. 4. In the past it has not been possible to retain the Botsolas et al type fitting covers in either of the shapes shown in FIGS. 2 and 3 unless such fitting covers were previously heat treated. With the structure of the present invention, however, the covers of this invention can be readily folded into and will retain either of the configurations shown in FIGS. 2 and 3 by themselves without assistance.

Figure 5:
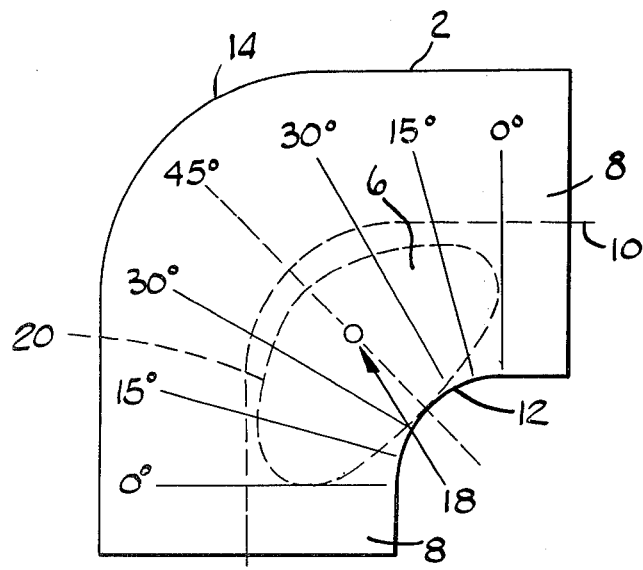
FIG. 5 is a side elevation view of the cover of this invention in its final closed configuration and showing for reference purposes the various points at which cross-sectional configuration are to be considered in the discussion below.
Figure 6:
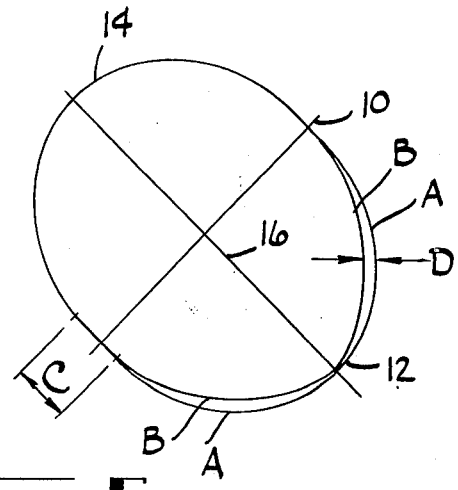
FIG. 6 is a schematic view illustrating a generalized cross section of the cover of this invention in the configuration shown in FIG. 5 referenced with letters for the purpose of dimensional description.

The present invention involves creating specifically dimensioned depressions 6 in the areas generally indicated in FIGS. 1, 4 and 5. The dimensions of these depressions are best illustrated in FIGS. 5 and 6. FIG. 5 is a side elevation view of a fitting cover 2 in its closed final position. The two lines designated "0°" indicate the ends of the curved segment of the elbow cover. The portions 8 extending beyond the 0° lines are straight tubular segments normally used to overlap the adjacent jacketing of the straight run abutting insulation sections in order to provide weather protection for the underlying insulation. For the purposes of the present invention these end segments 8 can be disregarded. In FIG. 4 is shown a typical restraining means 4, in this case exemplified by strips of adhesive tape. It is common to exend the tape over each end of the fitting cover so that the tape also adheres to the adjoining straight run insulation jacketing and forms a weather tight seal between the straight run jacketing and the elbow jacketing.

The line marked "45°" will herein be designated as the "center diagonal" of the elbow cover. This center diagonal lies at 45° to either of the 0° ends of the elbow cover and also represents the midpoint and generally the point of greater deviation of each depression 6, as will be explained below. The end lines at 0°, on the other hand, represent limits beyond which the depressions 6 do not extend and where the normal cross sectional configuration of the Botsolas et al type of fitting cover exists. The intermediate lines designated "15°" and "30°" lie at the designated angular distances from the 0° end lines and represent intermediate cross-sectional configurations A typical and generalized cross section is shown in FIG. 6. In this generalized cross section the dimension C represents the length of a generally straight segment which lies equally to either side of the lateral centerline 10. The line A represents a reference semicircle which begins at the end of one segment C and runs to the respective end of the other segment C. There is an equivalent semicircle at the other end of the cross section, and both have a radius equal to the radius of the circular cross section at the 0° end lines. For the purposes of discussion herein, the term "inner" will be used in conjunction with that portion of the elbow cover lying between the minimum elbow radius 12 and the lateral centerline 10 while the term "outer" will be used to designate that portion of the elbow cover lying between the maximum curvature 14 and the lateral centerline 10. The depressions which form the means providing intermediate positioning of the cover of this invention both lie entirely within the inner segment of the elbow cover as shown in FIGS. 5 and 6. Consequently the semicircular configuration of the outer section beyond the segments C remains unchanged from the Botsolas et al configuration.

The line B represents the actual cross-sectional shape of the lower segment of the elbow cover at any given angular line between each 0° and 45°. The line A is therefore only a reference line and does not represent a physical structure; however, at the 0° lines A and B will coincide. At all other angular lines between the two 0° lines, however, (except perhaps for a small distance adjacent to each of the 0° lines) line B will diverge inwardly from the reference line A thus forming a shallower curve. Lines A and B will be tangent at each end of the semicircle A where it joins the segment C and also at the midpoint of the semicircle A where it crosses the vertical centerline 16. The maximum distance between the lines A and B is designated by dimension D which normally will lie at or in the vicinity of the center of each half of semicircle A.

The dimensioning of line B and straight segment C is critical to the present invention. The length of the segment C will vary from zero at each of the 0° end lines, thus yielding the circular cross section at those end lines as previously discussed, to a maximum length at the 45° center diagonal. That maximum length will normally be determined by the exact shape of the depression 6, but generally will be on the order of ¼ to ¾ of the length of the radius of the semicircle A.

The length of the dimension D at or immediately in the vicinity of the center diagonal determines the nature of the depression 6. The maximum deviation from the semicircle A lies at position 18 and will normally be in the range of about 3% to about 10% of the length of the radius of reference semicircle A. If the maximum dimension D at or near the center diagonal is less than about 3% of the radius of semicircle A the cover will be unable to self-retain the configurations of FIGS. 2 and 3. On the other hand, if the maximum dimension D is greater than about 10% of the radius of semicircle A the cover when folded will frequently contain undesirable folds and kinks. Only when the maximum dimension D is in the range of about 3% to about 10% can the cover of this invention retain all of the desirable properties of the Botsolas et al cover, including the latter's smooth and clean appearance and fit, while yet being able to maintain either of the configurations of FIGS. 2 or 3 without assistance, a characteristic the Botsolas et al cover does not have unless heat treated.

The actual amount of the dimension D will be determined by the overall size of the fitting cover and by the material from which the fitting cover is made. Most commercial fitting covers are made from polyvinylchloride (PVC) sheets although other sheet materials such as silicon rubber or various other polymers may also be used. Those skilled in the art of plastic films and sheets can readily select appropriate materials and easily determine by routine experimentation the exact amount of maximum deviation for the depressions 6, i.e. the optimum length for the dimension D at position 18.

Once the optimum maximum dimension D has been determined the curvature of the remainder of the depression 6 may be smoothly tapered in both the radial and longitudinal directions from position 18 such that the circular curve at 12 and the straight segment along the lateral centerline are obtained and the circular cross section is resumed by the time the end lines at 0° are reached. The depression 6 thus tapers smoothly away from the position of maximum depression 18 until the normal configuration of the elbow cover is resumed at the perimeter 20 of each depression 6. It will be recognized that the exact shape of the depression 6 is not critical but will be determined by the particular degree of taper used in any given direction. Generally, however, each depression 6 will have somewhat the configuration shown in FIG. 5.

As a specific example, an elbow cover of the present invention having a circular end diameter of approximately 3" was molded by thermoforming from a sheet of 30 mil PVC. The maximum deviation at position 18 was 3/16". At the 30° angular line the dimension D was 3/32" and at the 15° line the dimension D was 1/32". The depressions 6 were smoothly tapered in all directions from position 18 as described above. The resultant elbow cover was found to be easily foldable into either of the positions shown in FIGS. 2 and 3 and would readily retain such shapes unaided. The elbow cover could be repeatedly folded and unfolded between the configurations shown in FIGS. 1 and 4, passing each time through the configurations shown in FIGS. 2 and 3, and did not at any time lose its ability to maintain itself unaided in either of the FIGS. 2 or 3 positions.

What is claimed is:

1. In an elbow cover for an insulated pipe elbow joint, wherein a single integral structure formed from a flexible, resilient, nonmetallic material is formed initially in a first elongated, open-ended, trough-like shape and is then manually folded into a second shape more generally corresponding to that of the insulated pipe elbow joint to be covered but wherein said covering requires an application of an external force to be retained in said second shape, the improvement comprising: means incorporated into said single integral structure which permits said cover to be manually folded into and retained in said second shape without the application of an external force, said means comprising depressions formed in the surface of the elbow cover and disposed such that when the elbow cover is closed around and in contact with said insulated pipe fitting said depressions appear in the inner portion of said elbow cover and are generally centered on the center diagonal of said elbow cover, and wherein each of said depressions has a maximum depth, measured from a semicircular curve having a radius equal to the outside radius of said insulated pipe elbow joint, of 3% to 10% of said radius.

2. An improved elbow cover as in claim 1 wherein said elbow cover can be manually folded from said second shape into a third shape in which the major portion of its inner surface is in contact with the outer surface of said insulated pipe elbow joint, and wherein said means comprises creating two depressions, one each adjacent to the respective ends of said trough-like said first shape, said depressions being dimensioned such that upon said folding of said cover into said third shape the radial cross section configuration comprises:

(a) at each end of said third shape, a circle having a radius equal to the outer radius of the insulated pipe elbow to be covered;

(b) at the center diagonal of said third shape,
  (i) a generally straight segment at each side of the elbow shape at the lateral centerline,
  (ii) a first semicircle joining the outer ends of said straight segments, where the radius of semicircle is substantially equal to said radius of said circle in (a) above, and,
  (iii) joining the inner ends of said generally straight segments, a curve which is tangent to a reference semicircle of radius equal to that of the first semicircle at its ends and midpoint and which is shallower than said reference semicircle in the curved segments between said ends and said midpoint by a deviation of about 3% to about 10% of the radius of said reference semicircle and in the vicinity of the center of each of said curved segments; and (c) at points along said lateral centerline of said third shape intermediate the ends and said center diagonal, cross-sectional configurations intermediate the cross-sectional configurations of subparagraphs (a) and (b) above whereby said depressions each curves smoothly from the cross-sectional configuration at one end through the cross-sectional configuration at the center diagonal to the cross-sectional configuration at the other end of said third shape.

* * * * *